June 24, 1930.  A. SCOTT  1,767,946
RIVETER
Filed Aug. 12, 1927
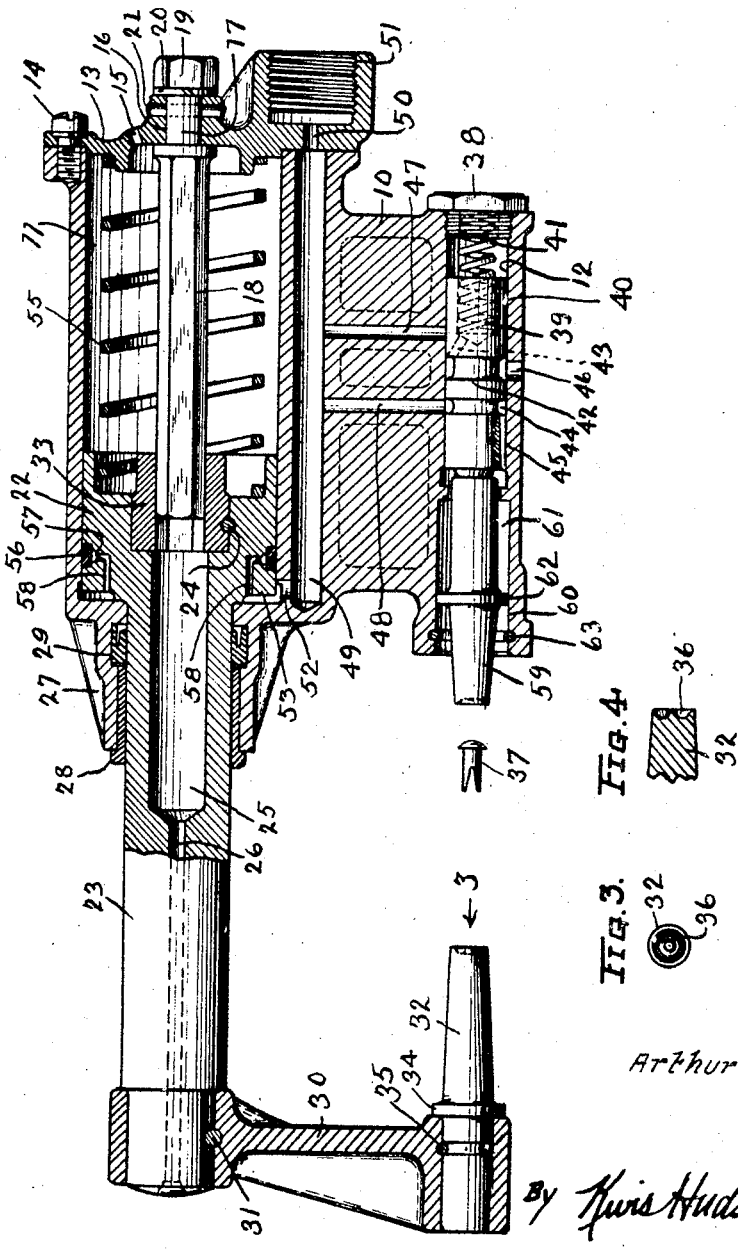
Inventor
Arthur Scott.
By Kwis Hudson & Kent
Attorney Patented June 24, 1930

1,767,946

UNITED STATES PATENT OFFICE

ARTHUR SCOTT, OF CLEVELAND, OHIO, ASSIGNOR TO THE CLEVELAND PNEUMATIC TOOL COMPANY, OF CLEVELAND, OHIO, A CORPORATION OF OHIO

RIVETER

Application filed August 12, 1927. Serial No. 212,405.

This invention relates to improvements in riveters, particularly riveters embodying an anvil as well as a moving die.

Riveters of this general nature have been previously so built that in operation a relatively fixed anvil is held up against one end of the rivet by the workman, while the application of power causes the moving die to be first brought up to the opposite end of the rivet and then actuated to perform the riveting operation.

Tools of this character are satisfactory where solid rivets are employed and the rivets are inserted into the rivet holes from the side of the work opposite to that upon which the workman is standing, that is to say, where the anvil engages the head of the rivet and the reciprocating die engages the end which is to be upset. However, in that class of work where it is desirable to have the upsetting performed by the anvil and to have the reciprocating die engage the rivet head, such a tool is difficult to employ and an attempt to use it often results in pushing the rivet out of its hole.

One of the objects of the present invention therefore is the provision of a tool which is well adapted to set rivets that are inserted with their heads toward the operator.

Another object is the provision of a tool in which the anvil is held to the work by power means.

Other objects are, first, the provision of a tool in which the anvil is moved up to the work after the operating die has been placed against the rivet, second, the holding of the anvil and die in alignment and, third, the retention of the movable die in its slide bearing by novel means.

Other objects and objects relating to details of construction and economies of manufacture, will appear as I proceed with the description of that embodiment of the invention which, for the purposes of the present application, I have illustrated in the accompanying drawing, in which—

Fig. 1 is a view principally in longitudinal section illustrating an application of my invention to a pneumatic riveting tool, this view showing also a rivet in the relation which it occupies to the tool as the latter is being brought into position for operation upon the rivet;

Fig. 2 is an end elevation of the tool;

Fig. 3 is an end elevation of the rivet anvil, the view being taken in the direction of arrow 3, Fig. 1; and Fig. 4 is a fragmentary section taken through the axis of the anvil.

In the drawing there is shown a cast metal block 10 containing a large cylinder 11 and a small cylinder 12. The cylinder 11 is closed at the rear end by a head 13 which is removably attached to the block 10 by means of screws 14. The head 13 is provided with a breather hole 15 and with a central opening 16 into which is closely fitted the constricted shank 17 of a polygonal guide bar 18, the shank being threaded at its outer end for the reception of a nut 19 by means of which the bar is clamped in place, a lock washer 20 being employed to prevent the nut from backing off due to vibration of the tool. The bar 18 is prevented from turning with respect to the head 13 by a pin 21 which is driven into aligning holes in the head and in the shank 17 of the bar.

A piston 22 which is preferably integral with a sliding yoke bar 23 is mounted within the cylinder 11. On its rear side it is counterbored to receive with a driving fit a bushing 33, these two parts being locked against relative rotation by a pin 24. The bushing 33 has a central polygonal opening therethrough formed to a close sliding fit with the bar 18. The yoke bar 23 is provided with a central bore 25 sufficiently large to clear the guide bar 18 when the piston moves rearwardly, and this bore 25 is connected with atmosphere by a breather passage 26. The block 10 has an extension 27 bored out to receive with a driving fit a bushing 28 and also having therein an annular groove for the reception of a packing 29 so formed as to expand under the effect of motive fluid and thus effectually seal the joint between the block and the sliding yoke bar 23.

The end of the yoke bar 23 is reduced and receives with a tight fit a yoke member 30, these two parts being locked together by a pin 31. The opposite end of the member 30 is bored out to take the shank of an anvil member 32 having a shoulder 34 which bears against the member 30 to transmit the strain of the riveting operation to the latter, accidental movement in the opposite direction being prevented by a pin 35 which is removable in order that new anvils may be inserted from time to time if necessary. The forward or operating end of the anvil 32 may be formed, as shown in Figs. 3 and 4, with an annular depression 36 by means of which a split rivet 37 may be upturned, but this particularity in disclosure is for purposes of illustration only, as obviously the invention is not limited to tools for driving rivets of any particular design.

The cylinder 12 is in alignment with the anvil 32. It is closed at the rear with a head 38 having a reduced hollow threaded portion that is screwed into the end of the cylinder. In this cylinder there is a piston 39, the rear end of which is bored out, as indicated at 40, for the reception of a coil spring 41 that bears against the head 38 and tends to hold the piston 39 in its forward position as illustrated. The piston is formed with an annular groove 42 connected with the bore in the rear of the piston by a drilled passage 43. There is also a second somewhat smaller annular groove 44 that has connection with the forward end of the piston through a lengthwise groove 45. In the wall of the cylinder 12 there is an exhaust port 46 opening to atmosphere.

Fluid intake to the cylinder 12 is through two drilled passages 47 and 48 that connect with a manifold passage 49 in the block 10, which receives motive fluid through an opening 50 in the head 13. The latter has a threaded socket 51 in alignment with the opening 50, and to this socket any suitable hose connection may be attached for conducting motive fluid to the tool, this motive fluid being usually compressed air. From the forward end of the manifold 49 a short passage 52 leads into the forward end of cylinder 11. The forward end of the piston 22 is cut away as shown at 53, so that pressure fluid may be admitted to the cylinder when the piston is in its most advanced position, as it will be normally, due to the action of a coil spring 55 which bears upon the rear side of the piston. The latter is provided with an annular packing or piston ring 56 set into the periphery of the piston just above an annular groove 57 which is fed by one or more ducts 58 connecting with the forward end of the piston and by means of which pressure is brought to bear upon the inner side of the ring 56 so as to form an effective seal between the piston 22 and its cylinder.

A reciprocable rivet set or die 59 is mounted in a cylindrical opening 60 in front of and in alignment with cylinder 12, the shank of the die sliding in a bushing 61. There is a flange or enlargement 62 on the die which slides in the cylinder 60 and which serves by engagement with a spring ring 63 set into the cylinder 60 to limit the outward movement of the die and to prevent its accidental displacement through the end of the cylinder.

After a rivet, such as the rivet 37, has been placed in its hole, the workman brings the tool into position and holds the die 59 up against the head of the rivet. Then by the manipulation of any suitable throttle valve, not shown, compressed air or other motive fluid is admitted to manifold passage 49. The air immediately travels through short passage 52 into the forward end of cylinder 11 and causes piston 22 to move rearwardly against spring 55, thus pulling upon yoke bar 23, yoke member 30 and anvil 32, and causing the latter to move up against the forward end of the rivet. At the same time the piston 39 is set in motion and hammers upon the rear end of the die 59, producing rapid reciprocation of the later, and thus by a series of blows forces the open end of the rivet against the curved wall of the groove 36 in the anvil and upsets the rivet. In the operation of the tool pneumatic pressure is thus made effective upon both ends of the rivet, and no effort upon the part of the workman is required other than what is necessary to position the tool and support it during operation. Therefore, the number of rivets which may be set within a given period is increased and, furthermore, the job is done better and more uniformly.

In the present instance the rivet die is operated by a valveless piston in the following manner. Assuming that the piston 39 is in its normal forward position as illustrated, and that air under pressure is admitted to manifold passage 49, the air then flows through passage 48 to annular passage 44 and through groove 45 into a slight enlargement at the forward end of cylinder 12, thereby forcing piston 39 rearwardly against the action of spring 41. As soon as the annular groove 44 registers with exhaust port 46 and annular groove 42 registers with inlet passage 47, the piston stops, pressure at the forward end is relieved through groove 45, groove 44 and port 46 and live air moves to the rear of the piston through passage 47, annular groove 42 and passage 43.

The piston then moves forward until it again reaches the position illustrated, whereupon the motive fluid at the rear is exhausted by way of passage 43, annular groove 42 and port 46, and motive fluid is again admitted to the cylinder in front of the piston for the return stroke thereof. The cycle then repeats itself. This structure is employed merely because of its simplicity. Any other form of piston and arrangement of ports and valves may be substituted, since the details of this part of the tool are not essential to the present invention.

When the rivet setting operating is completed the operator manipulates the throttle valve to cut off the supply of motive fluid to manifold passage 49, whereupon air is exhausted from the forward end of cylinder 11 and spring 55 moves the anvil away from the work.

In assembling the tool it is, of course, essential that there be perfect alignment of the anvil 32 and die 59. In accomplishing this object the parts 30, 23 and 33 are held in absolutely rigid relation by the means heretofore described. The bar 18 is then mounted in head 13 more or less loosely, the bar 18 is caused to engage the opening in the bushing 33 and the head 13 is secured to the block or body 10. Thereupon the anvil 32 and die 59 are brought into alignment, the shank 17 of bar 18 being free to turn in head 13. The nut 19 is then screwed down and the head 13 and shank 17 are drilled for the pin 21, after which the latter is driven into place.

While I have described the invention with more or less particularity and illustrated the same somewhat in detail, such detailed disclosure is resorted to for the purpose merely of complying with the statute, and the invention is to be construed as limited only in such respects as are mentioned in the appended claims.

Having thus described my invention, I claim:

1. In a pneumatic riveter, an anvil, a die, a piston rigidly connected with the anvil, a second piston adapted to operate the die, a block containing cylinders for both said pistons, one of said cylinders being out of alignment with said anvil and die, means for preventing rotation of the piston for said last named cylinder, whereby said anvil and die are maintained in alignment, and means for introducing pressure fluid to both said cylinders to actuate said pistons substantially simultaneously.

2. A riveting tool, a moving die having a head of reduced size, an open ended cylinder in which said die is mounted for sliding movement, said cylinder having a peripheral groove near its open end, and a split ring mounted in said groove and adapted to engage said die behind its head.

3. In a pneumatic riveter, an anvil, a die, a piston connected with the anvil, a second piston adapted to operate the die, a block containing cylinders for both said pistons, one of said cylinders being out of alignment with said anvil and die, means for maintaining said anvil and die in alignment, and means for introducing pressure fluid to both said cylinders to actuate said pistons substantially simultaneously.

In testimony whereof, I hereunto affix my signature.

ARTHUR SCOTT.